US009594292B2

(12) United States Patent
Yagi et al.

(10) Patent No.: US 9,594,292 B2
(45) Date of Patent: Mar. 14, 2017

(54) ELECTRONIC DEVICE INCLUDING A HOUSING AND A CAMERA THAT IS ACTIVATED BASED ON A POSTURE AND A GRABBING FORM

(71) Applicant: NIKON CORPORATION, Tokyo (JP)

(72) Inventors: Takeshi Yagi, Tokyo (JP); Mikiya Tanaka, Chigasaki (JP); Takayuki Sawajiri, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 57 days.

(21) Appl. No.: 14/175,538

(22) Filed: Feb. 7, 2014

(65) Prior Publication Data
US 2014/0152858 A1  Jun. 5, 2014

Related U.S. Application Data

(63) Continuation of application No. PCT/JP2012/070383, filed on Aug. 9, 2012.

(30) Foreign Application Priority Data

Aug. 10, 2011  (JP) ................... 2011-175091
Jan. 18, 2012  (JP) ................... 2012-008271

(51) Int. Cl.
G03B 15/00 (2006.01)
G03B 17/02 (2006.01)
(Continued)

(52) U.S. Cl.
CPC ............. *G03B 15/00* (2013.01); *G03B 17/02* (2013.01); *G03B 17/38* (2013.01); *G06F 3/041* (2013.01);
(Continued)

(58) Field of Classification Search
CPC ........ G03B 15/00; G03B 17/38; G03B 17/02; G03B 2217/005; G06F 3/041; G06F 2200/1637
(Continued)

(56) References Cited

U.S. PATENT DOCUMENTS 8,721,960 B2    5/2014  Iwase et al.
8,860,866 B2 *  10/2014 Yasuda ............. H04N 5/23293
                                                    348/208.99
(Continued)

FOREIGN PATENT DOCUMENTS

JP    2008-42330      2/2008
JP    2008-306404  * 12/2008  ............. H04N 5/225
(Continued)

OTHER PUBLICATIONS

International Search Report mailed Nov. 6, 2012 in corresponding International Patent Application No. PCT/JP2012/070383.
(Continued)

Primary Examiner — Nhan T Tran
Assistant Examiner — Chan Nguyen
(74) Attorney, Agent, or Firm — Staas & Halsey LLP

(57) ABSTRACT

An electronic device includes a camera; an acceleration sensor that detects an acceleration applied to a housing; a posture determining unit that determines a posture of the housing based on a value detected by the acceleration sensor; and an activation control unit that activates the camera when the posture determining unit determines that the posture of the housing becomes an upright posture.

5 Claims, 16 Drawing Sheets

(51) Int. Cl.
*G03B 17/38* (2006.01)
*G06F 3/041* (2006.01)

(52) U.S. Cl.
CPC ............... *G03B 2217/005* (2013.01); *G06F 2200/1637* (2013.01)

(58) Field of Classification Search
USPC ........................................ 348/208.1–208.3
See application file for complete search history.

(56) References Cited

U.S. PATENT DOCUMENTS

| | | | |
|---|---|---|---|
| 2009/0067826 | A1 | 3/2009 | Shinohara et al. |
| 2010/0316349 | A1 | 12/2010 | Nagano |
| 2011/0085778 | A1 | 4/2011 | Iwase et al. |
| 2012/0057064 | A1* | 3/2012 | Gardiner ............... G06F 1/1626 348/333.12 |
| 2012/0206488 | A1* | 8/2012 | Wong ..................... G06F 3/147 345/649 |
| 2014/0137630 | A1* | 5/2014 | Yagi ..................... G06F 3/0346 73/1.37 |

FOREIGN PATENT DOCUMENTS

| | | | | |
|---|---|---|---|---|
| JP | 2009-89345 | 4/2009 | | |
| JP | 2009-225361 | 10/2009 | | |
| JP | 2010-226430 | * 10/2010 | ............ | H04N 5/225 |
| JP | 2010-250608 | 11/2010 | | |
| JP | 2011-3224 | 1/2011 | | |
| JP | 2011 19116 | 1/2011 | | |

OTHER PUBLICATIONS

English Abstract and Machine Translation of Japanese Reference No. 2010-226430, Reference AI in the IDS filed Feb. 7, 2014.
English Abstract and Machine Translation of Japanese Reference No. 2008-306404, Reference AG in the IDS filed Feb. 7, 2014.
Written Opinion of the International Searching Authority mailed Nov. 6, 2012 in corresponding International Patent Application No. PCT/JP2012/070383.
Japanese Office Action dated Nov. 17, 2015 in corresponding Japanese Patent Application No. 2012-008269.
Office Action issued by the Japanese Patent Office on Apr. 5, 2016 in corresponding Japanese patent application No. 2013-528070.
Office Action issued by the Patent Office of Japan on Nov. 1, 2016 in corresponding Japanese patent application No. 2013-528070.

* cited by examiner

ELECTRONIC DEVICE INCLUDING A HOUSING AND A CAMERA THAT IS ACTIVATED BASED ON A POSTURE AND A GRABBING FORM

CROSS-REFERENCE TO RELATED APPLICATION

This is a Continuation Application of International Application No. PCT/JP2012/070383, filed on Aug. 9, 2012, which claims priority to Japanese Patent Application No. 2011-175091 filed on Aug. 10, 2011 and Japanese Patent Application No. 2012-008271 field on Jan. 18, 2012, the contents of which are incorporated herein by reference.

BACKGROUND

Field of the Invention

The present invention relates to an electronic device.

Description of the Related Art

In the related art, electronic devices having various sensors are known (for example, see Japanese Unexamined Patent Application, First Publication No. 2010-250608).

SUMMARY

However, the electronic devices according to the related art have room for improvement in operability by a user. An object of the present invention is to provide an electronic device with improved operability.

According to an aspect of the present invention, there is provided an electronic device including: a housing; a camera; an acceleration sensor that detects an acceleration applied to the housing; a posture determining unit that determines a posture of the housing based on a value detected by the acceleration sensor; an activation control unit that activates the camera when the posture determining unit determines that the posture of the housing becomes an upright posture; and a grasping form recognizing unit that recognizes a user's grasping form of the housing, wherein the activation control unit activates the camera when the posture determining unit determines that the posture of the housing becomes the upright posture and the grasping form recognizing unit recognizes that the user's grasping form of the housing is not a grasping form of covering a lens of the camera.

According to another aspect of the present invention, there is provided an electronic device including: a housing; a camera; an acceleration sensor that detects an acceleration applied to the housing; a posture determining unit that determines a posture of the housing based on a value detected by the acceleration sensor; an activation control unit that activates the camera when the posture determining unit determines that the posture of the housing becomes an upright posture; and a movement recognizing unit that recognizes movement of the housing based on a value detected by the acceleration sensor, wherein the activation control unit activates the camera when the posture determining unit determines that the posture of the housing becomes the upright posture and the movement recognizing unit recognizes that the housing is shaken.

According to still another aspect of the present invention, there is provided an electronic device including: a housing; a camera; an acceleration sensor that detects an acceleration applied to the housing; a posture determining unit that determines a posture of the housing based on a value detected by the acceleration sensor; an activation control unit that activates the camera when the posture determining unit determines that the posture of the housing becomes an upright posture; and a pressure sensor that detects a pressure applied to a predetermined position of the housing, wherein the activation control unit activates the camera when the posture determining unit determines that the posture of the housing becomes the upright posture and the pressure sensor detects a pressure applied to the predetermined position of the housing.

According to still another aspect of the present invention, there is provided an electronic device including: a housing; a camera; an acceleration sensor that detects an acceleration applied to the housing; a posture determining unit that determines a posture of the housing based on a value detected by the acceleration sensor; an activation control unit that activates the camera when the posture determining unit determines that the posture of the housing becomes an upright posture; and a plurality of other functions other than the function of the camera, wherein the activation control unit controls activation of the plurality of other functions in addition to the activation of the camera and activates the camera when the posture determining unit determines that the posture of the housing becomes the upright posture and a predetermined function is activated.

According to the aspects of the present invention, it is possible to further improve operability.

DESCRIPTION OF EMBODIMENTS

First Embodiment

Hereinafter, a first embodiment of the present invention will be described with reference to the accompanying drawings. An electronic device 7a according to the first embodiment is an electronic device in which a camera 300 is automatically activated with only a condition which is a variation in posture (variation from a fallen state to an upright state) of a housing (that is, the electronic device 7a).

Figure 1A:
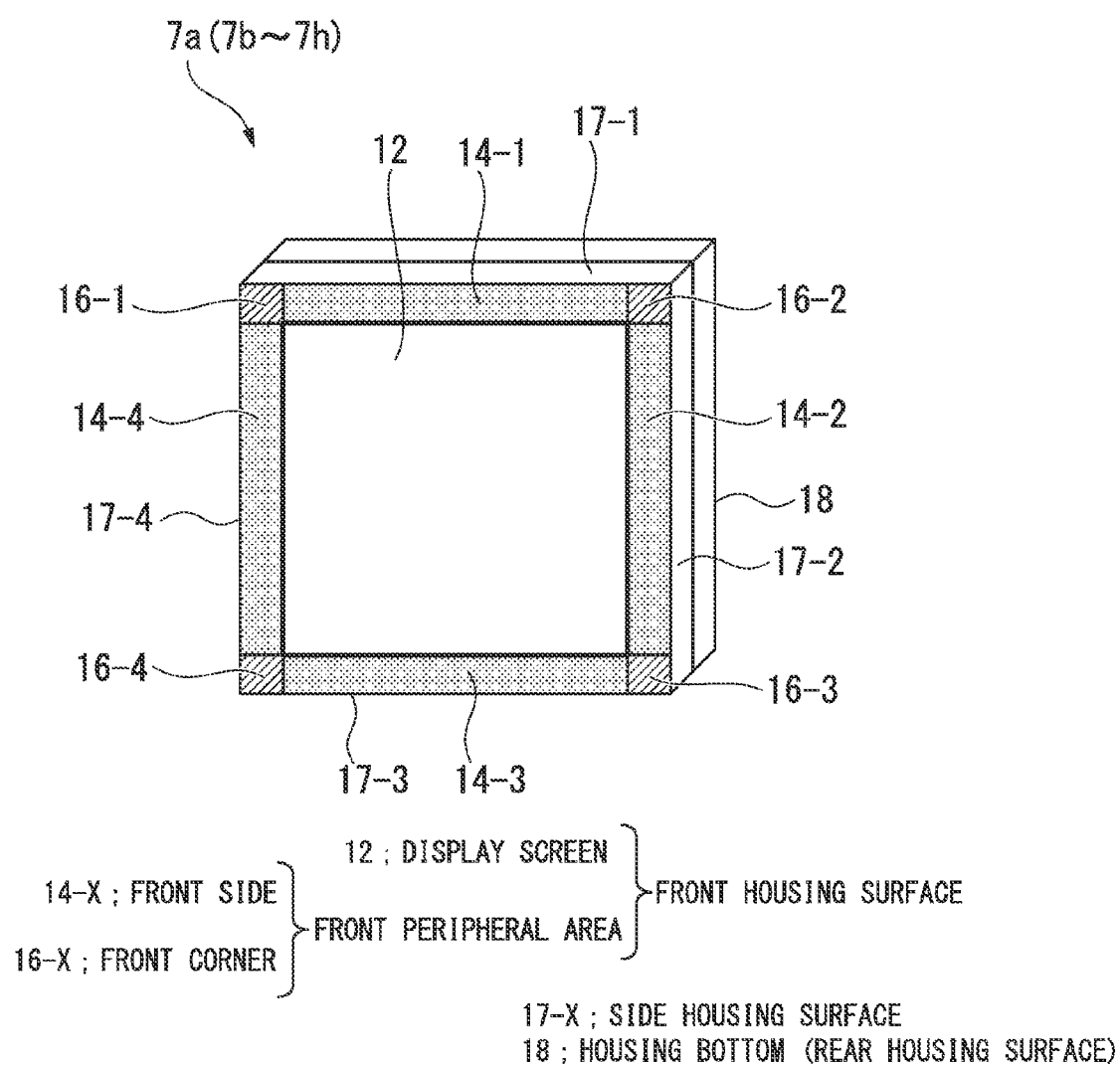
FIG. 1A is a schematic diagram illustrating an appearance of an electronic device according to a first embodiment of the present invention.
Figure 1B:
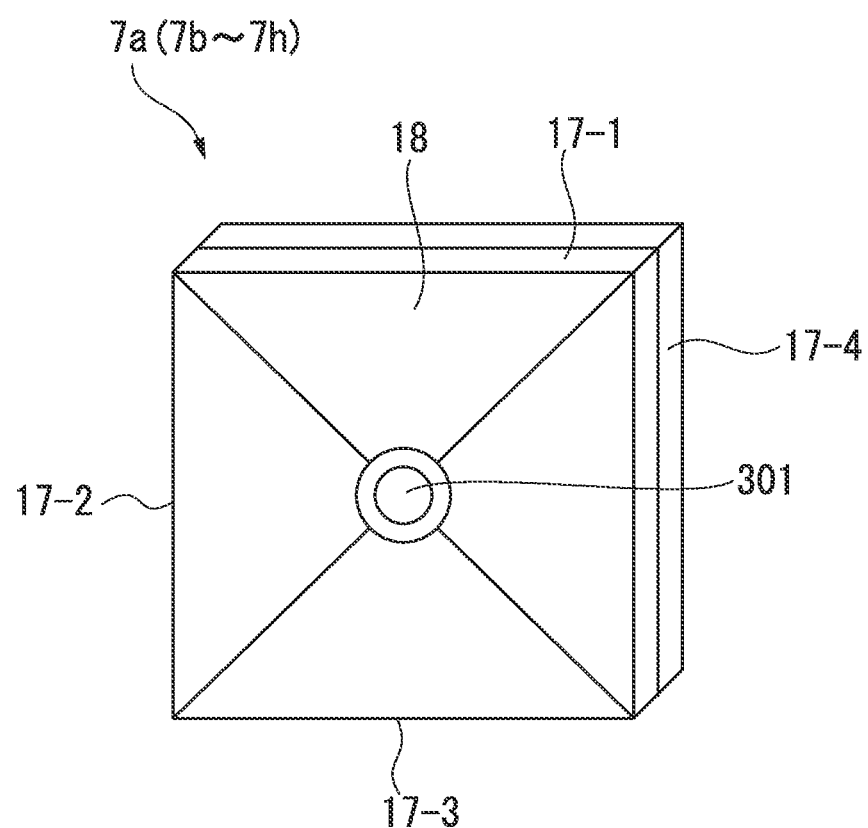
FIG. 1B is a schematic diagram illustrating an appearance of the electronic device according to the first embodiment of the present invention.
Figure 2A:
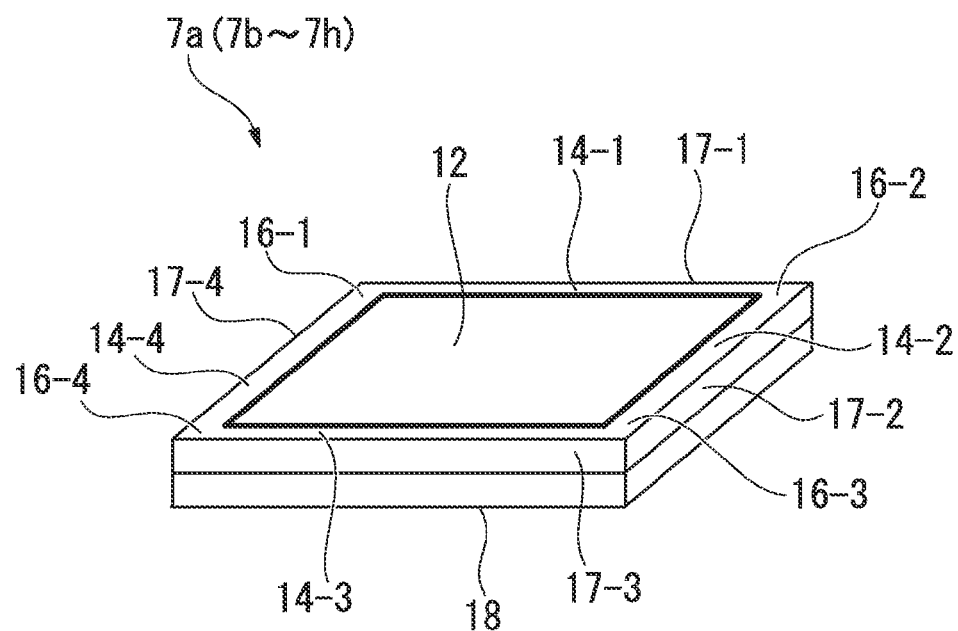
FIG. 2A is a schematic diagram illustrating an appearance of the electronic device according to the first embodiment of the present invention.
Figure 2B:
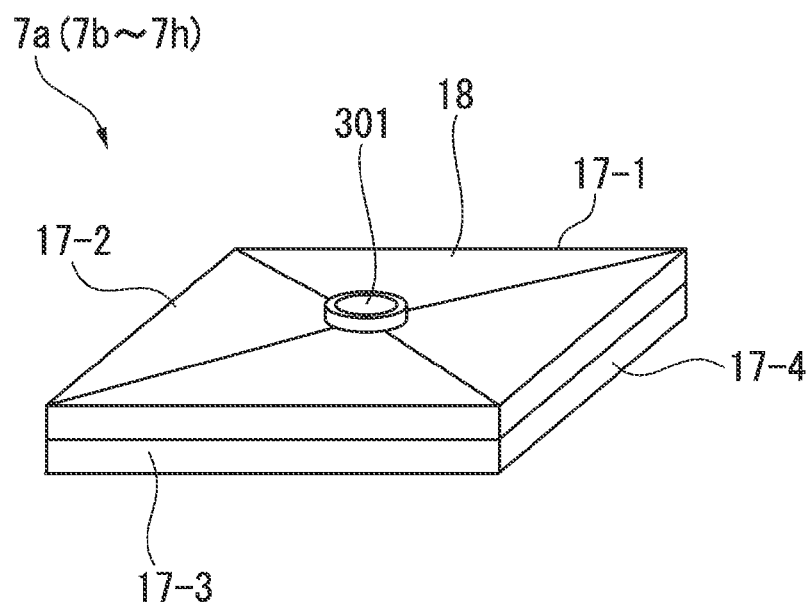
FIG. 2B is a schematic diagram illustrating an appearance of the electronic device according to the first embodiment of the present invention.

FIGS. 1A and 1B and FIGS. 2A and 2B are schematic diagrams illustrating an appearance of the electronic device 7a. FIGS. 1A and 1B illustrate an upright posture of the housing and FIGS. 2A and 2B illustrate a fallen posture of the electronic device 7a. The electronic device 7a includes a display screen 12 on the front housing surface as illustrated in FIGS. 1A and 2A. In the electronic device 7a, a housing bottom (rear housing surface) 18 is provided with a lens 301 of a camera 300 as illustrated in FIGS. 1B and 2B.

An area located on the outer circumference of the display screen 12 on the front housing surface is a peripheral area including sides 14-1, 14-2, 14-3, and 14-4 (shaded parts in FIG. 1A) and corners 16-1, 16-2, 16-3, and 16-4 (hatched portions in FIG. 1A). Reference numerals 17-1, 17-2, 17-3, and 17-4 represent side housing surfaces.

Figure 3:
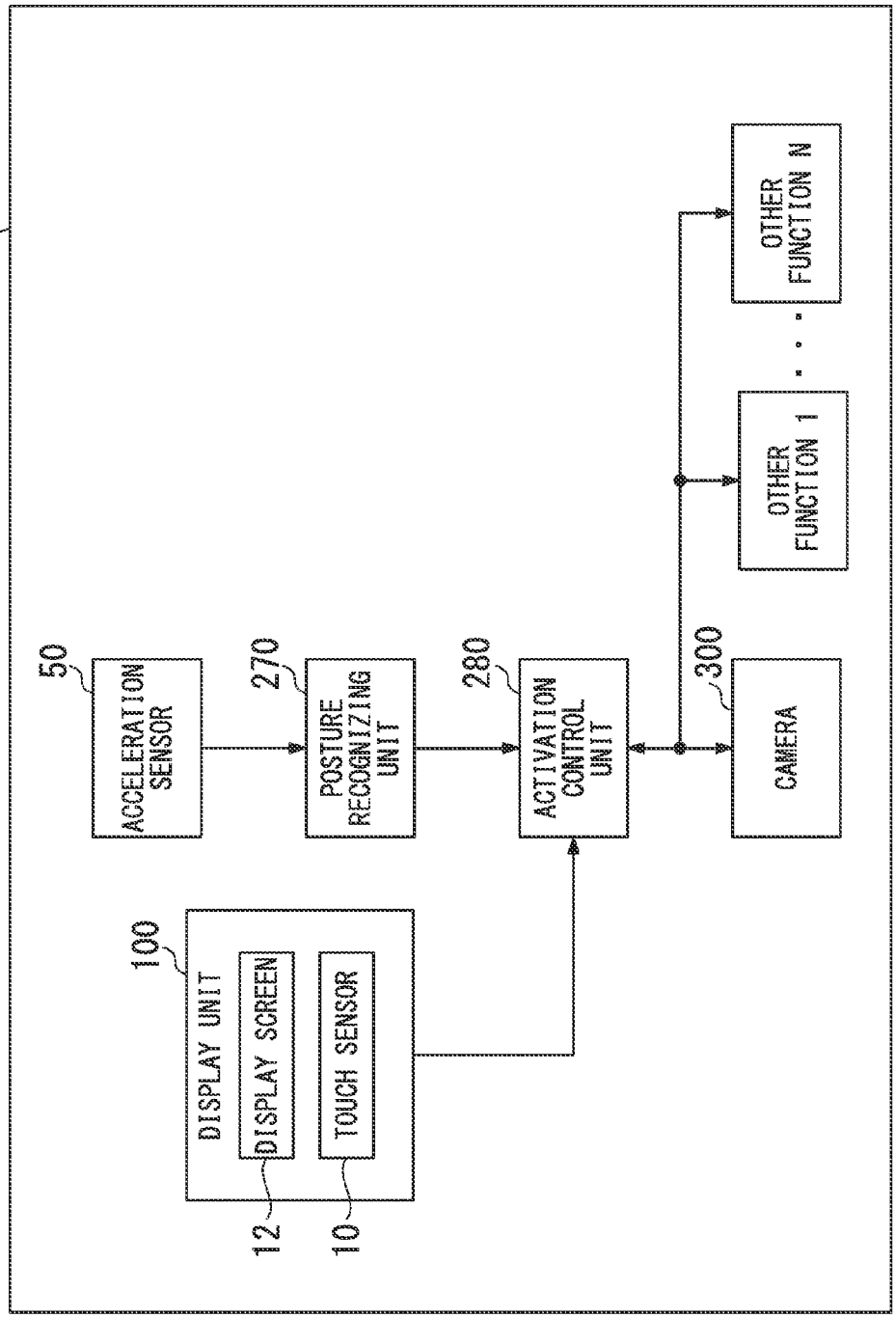
FIG. 3 is a functional block diagram illustrating an example of the electronic device according to the first embodiment of the present invention.

FIG. 3 is a functional block diagram illustrating an example of the electronic device 7a. The process flow in the electronic device 7a will be described later.

As illustrated in FIG. 3, the electronic device 7a includes an acceleration sensor 50, a display unit (touch panel) 100, a posture recognizing unit (posture determining unit) 270, an activation control unit 280, a camera 300, and other functions 1 to N.

The other functions 1 to N are functions (including software and hardware) other than the function of the camera 300. The other functions are not particularly limited as long as they can be performed by the electronic device 7a, and examples thereof include image reproduction, music reproduction, calling, communication, and execution of game software.

The acceleration sensor 50 detects an acceleration applied to the housing. The display unit 100 includes a display screen 12 and a touch sensor 10. The display screen 12 displays a variety of information. The touch sensor 10 detects a touch of the display screen 12.

The posture determining unit 270 determines a posture of the housing based on the value detected by the acceleration sensor 50. Specifically, the posture determining unit 270 determines whether the posture of the housing is an upright posture as illustrated in FIGS. 1A and 1B or a fallen posture as illustrated in FIGS. 2A and 2B.

The activation control unit 280 controls activation of the camera 300 and the other functions. For example, the activation control unit 280 controls activation of the camera 300 and the other functions based on an explicit instruction (for example, a touch of each icon) input via the touch sensor 10 by a user.

When the posture determining unit 270 determines that the posture of the housing becomes an upright posture, the activation control unit 280 activates the camera 300 automatically (without an explicit instruction by a user). For example, when a user uses the electronic device with the housing fallen as illustrated in FIGS. 2A and 2B and does not activate the camera 300 (for example, when a video is being reproduced) and the user makes the housing upright as illustrated in FIGS. 1A and 1B, the activation control unit 280 automatically activates the camera 300 (for example, after stopping the reproduction of a video when the video is being reproduced).

Second Embodiment

A second embodiment of the present invention will be described below. An electronic device 7b according to the second embodiment (the same is true of an electronic device 7c according to a third embodiment, an electronic device 7d according to a fourth embodiment, and an electronic device 7e according to a fifth embodiment) is an electronic device in which a camera 300 is activated based on a condition of a grasping form of a housing in addition to a condition which is a variation in the posture of the housing.

Figure 4:
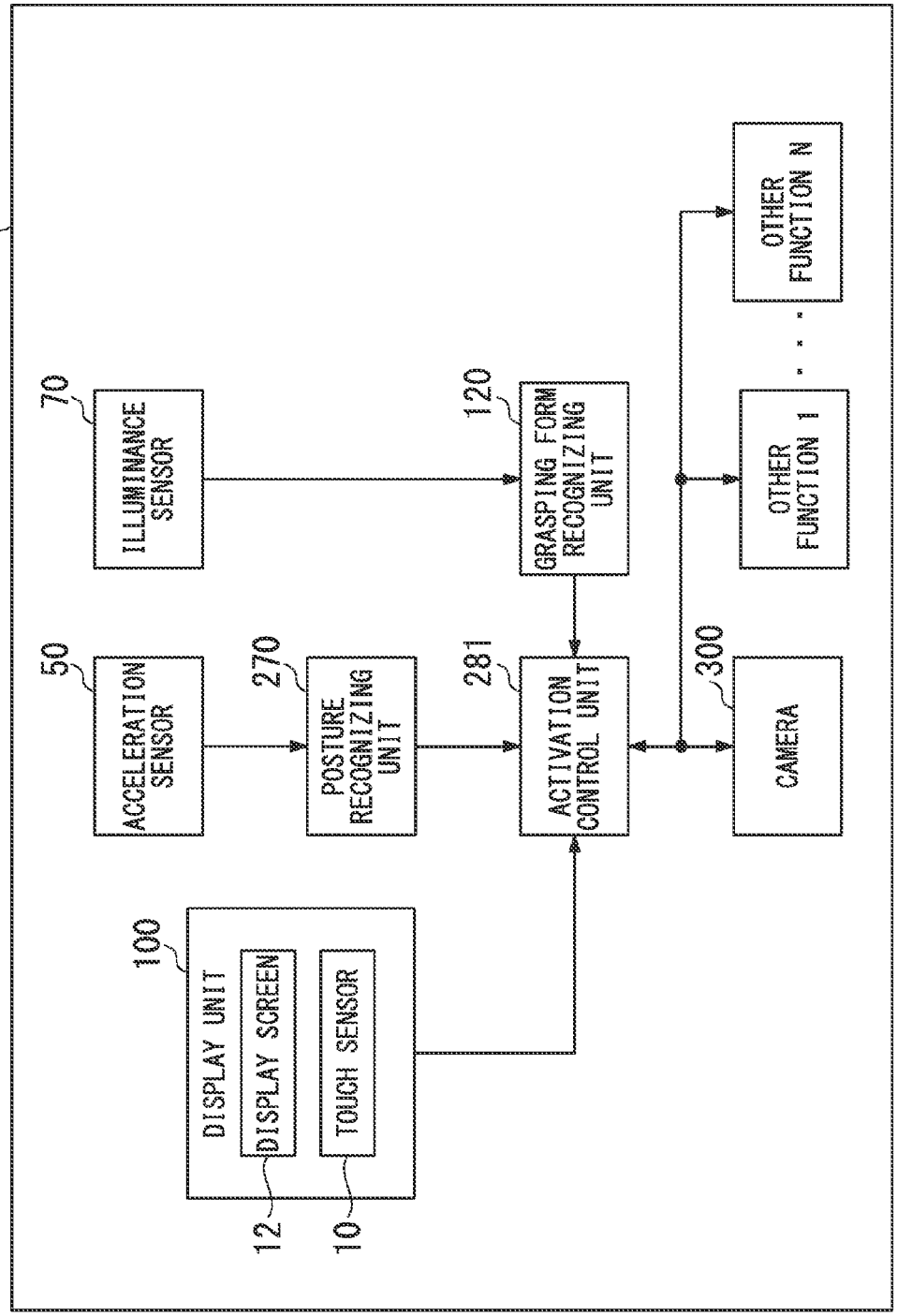
FIG. 4 is a functional block diagram illustrating an example of an electronic device according to a second embodiment of the present invention.

FIG. 4 is a functional block diagram illustrating an example of the electronic device 7b. The appearance of the electronic device 7b is the same as the electronic device 7a according to the first embodiment. The process flow in the electronic device 7b will be described later.

As illustrated in FIG. 4, the electronic device 7b includes an acceleration sensor 50, an illuminance sensor 70, a display unit 100, a grasping form recognizing unit 120, a posture recognizing unit 270, an activation control unit 281, a camera 300, and other functions 1 to N. In FIG. 4, the same reference numerals as in FIG. 3 represent the same functions and thus a description of a part or all thereof will not be repeated here.

The illuminance sensor 70 detects (measures) illuminance. A predetermined number (one or more) of illuminance sensors 70 capable of recognizing a grasping form are installed at positions at which a grasping form can be recognized (for example, on the same surface (the rear housing surface 18) as the lens 301 to detect brightness around the lens 301).

The grasping form recognizing unit 120 recognizes a user's grasping form of the housing. Specifically, the grasping form recognizing unit 120 recognizes (determines) whether the user's grasping form of the housing is a grasping form of covering the lens 301 of the camera 300. More specifically, the grasping form recognizing unit 120 recognizes whether the user's grasping form of the housing is a grasping form of covering the lens 301 of the camera 300 based on the detected value output from the illuminance sensor 70.

For example, the grasping form recognizing unit 120 recognizes whether the user's grasping form of the housing is a grasping form of covering the lens 301 as follows.

The grasping form recognizing unit 120 acquires and temporarily stores the detected value output from the illuminance sensor 70 for every predetermined time (for example, every 10 minutes). When determining the grasping form (for example, when the posture determining unit 270 determines that the posture of the housing becomes an upright posture), the grasping form recognizing unit 120 calculates a reference value (for example, an average value) based on the detected value output from the illuminance sensor 70 for a predetermined period of time (for example, 1 hour) just before the determination, compares the calculated reference value with the detected value output from the illuminance sensor 70 currently (that is, at the time of determination), and recognizes whether the user's grasping form of the housing is the grasping form of covering the lens 301.

That is, the grasping form recognizing unit 120 recognizes that the user's grasping form of the housing is the grasping form of covering the lens 301 when the currently-detected value is smaller by a predetermined threshold value than the reference value (that is, when it is darker by a predetermined threshold value than the brightness for a predetermined period of time just before the determination), and recognizes that the user's grasping form of the housing is not the grasping form of covering the lens 301 when the currently-detected value is not smaller by the predetermined threshold value than the reference value (that is, when it is not darker by a predetermined threshold value than the brightness for a predetermined period of time just before the determination).

The grasping form recognizing unit 120 may not calculate the reference value but calculate a newest reference value appropriately (for example, for every predetermined time) at the time of determining the grasping form, temporarily stores the calculated newest reference value, may compare the temporarily-stored newest reference value with the detected value currently output from the illuminance sensor 70 at the time of determining the grasping form, and may recognize whether the user's grasping form of the housing is the grasping form of covering the lens 301 of the camera 300.

The activation control unit 281 controls activation of the camera 300 and the other functions. For example, the activation control unit 281 controls activation of the camera 300 and the other functions based on an explicit instruction input via the touch sensor 10 by a user.

When the posture determining unit 270 determines that the posture of the housing becomes the upright posture and the grasping form recognizing unit 120 recognizes that the user's grasping form of the housing is not the grasping form of covering the lens 301 (that is, when the grasping form recognizing unit 120 recognizes that the user's grasping form of the housing is a grasping form of not covering the lens 301), the activation control unit 281 automatically activates the camera 300. For example, when a user uses the electronic device with the housing fallen as illustrated in FIGS. 2A and 2B and does not activate the camera 300 (for example, when a video is being reproduced), the user makes the housing upright as illustrated in FIGS. 1A and 1B, and it is determined that the lens 301 is not covered with the user's finger or the like, the activation control unit 281 automatically activates the camera 300 (for example, after stopping the reproduction of a video when the video is being reproduced).

Third Embodiment

A third embodiment of the present invention will be described below. An electronic device 7c according to the third embodiment is different from the electronic device 7b according to the second embodiment, in that the user's grasping form of the housing is recognized based on the detected value output from the touch sensor 10.

Figure 5:
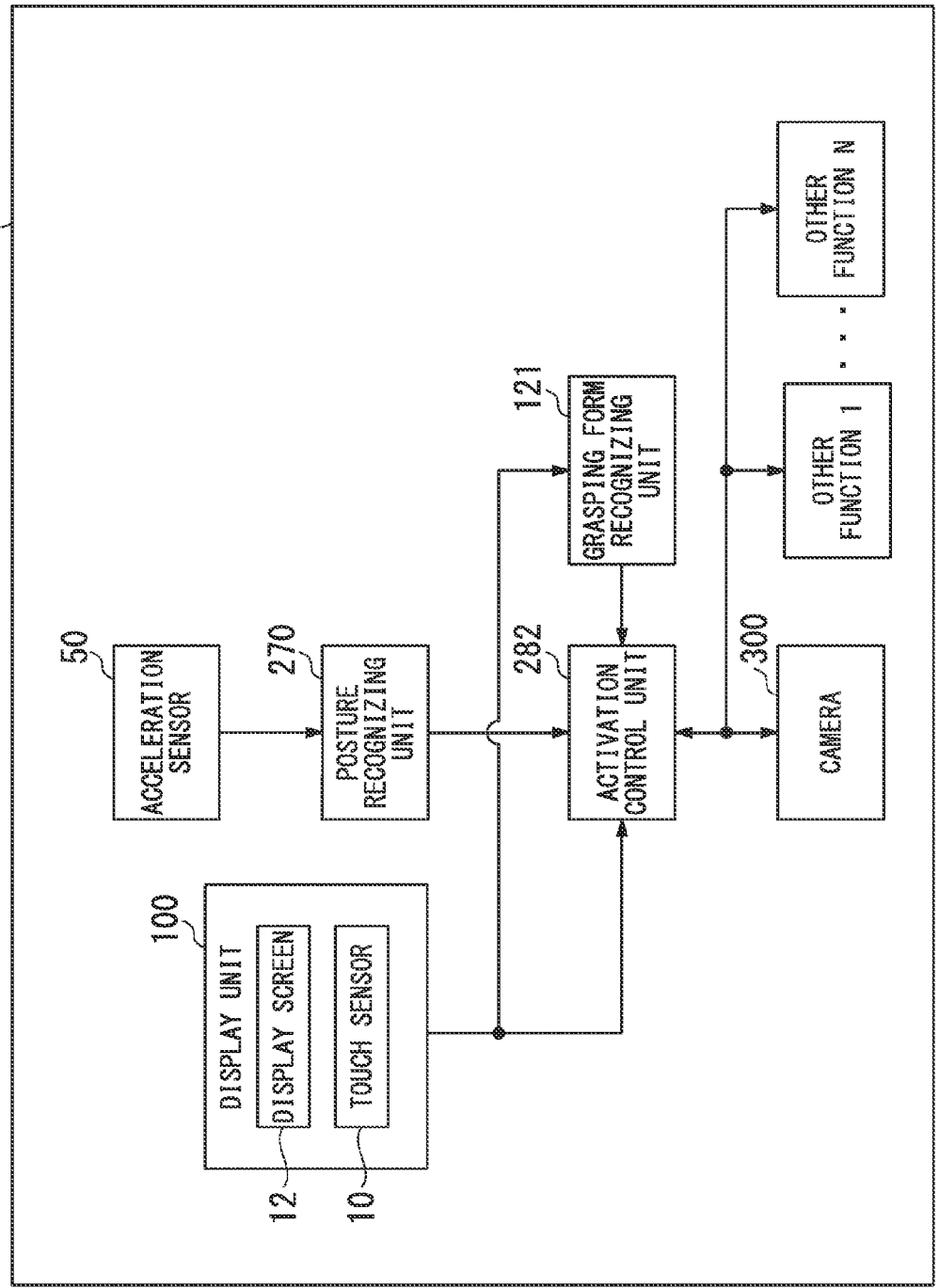
FIG. 5 is a functional block diagram illustrating an example of an electronic device according to a third embodiment of the present invention.

FIG. 5 is a functional block diagram illustrating an example of the electronic device 7c. The appearance of the electronic device 7c is the same as the electronic device 7a according to the first embodiment. The process flow in the electronic device 7c will be described later.

As illustrated in FIG. 5, the electronic device 7c includes an acceleration sensor 50, a display unit 100, a grasping form recognizing unit 121, a posture recognizing unit 270, an activation control unit 282, a camera 300, and other functions 1 to N. In FIG. 5, the same reference numerals as in FIG. 3 or 4 represent the same functions and thus a description of a part or all thereof will not be repeated here.

The grasping form recognizing unit 121 recognizes a user's grasping form of the housing. Specifically, the grasping form recognizing unit 121 recognizes (determines) whether the user's grasping form of the housing is a grasping form of covering the lens 301 of the camera 300. More specifically, the grasping form recognizing unit 121 recognizes whether the user's grasping form of the housing is a grasping form of covering the lens 301 of the camera 300 based on the detected value (touched position) output from the touch sensor 10.

In general, a position at or an amount by which the display screen 12 of the front housing surface is touched with a finger or the like is different between a grasping form of covering the lens 301 and a grasping form of not covering the lens 301. Therefore, for example, the grasping form recognizing unit 121 recognizes whether the user's grasping form of the housing is the grasping form of covering the lens 301 as follows.

A pattern of the detected values of the touch sensor 10 in a representative grasping form of covering the lens 301 and a pattern of the detected value of the touch sensor 10 in a representative grasping form of not covering the lens 301 are acquired and stored in advance. When determining the grasping form (for example, when the posture determining unit 270 determines that the posture of the housing becomes the upright posture), the grasping form recognizing unit 121 compares the detected values currently output from the touch sensor 10 with the patterns stored in advance and recognizes whether the user's grasping form of the housing is the grasping form of covering the lens 301.

That is, the grasping form recognizing unit 121 recognizes that the user's grasping form of the housing is the grasping form of covering the lens 301 when the currently-detected value is closer to the pattern of the detected value of the touch sensor 10 in the representative grasping form of covering the lens 301 than the pattern of the detected values of the touch sensor 10 in the representative grasping form of not covering the lens 301, and recognizes that the user's grasping form of the housing is not the grasping form of the covering the lens 301 otherwise.

The activation control unit 282 controls activation of the camera 300 and the other functions. For example, the activation control unit 282 controls activation of the camera 300 and the other functions based on an explicit instruction input via the touch sensor 10 by a user.

When the posture determining unit 270 determines that the posture of the housing becomes the upright posture and the grasping form recognizing unit 121 recognizes that the user's grasping form of the housing is not the grasping form of covering the lens 301, the activation control unit 282 automatically activates the camera 300. For example, when a user uses the electronic device with the housing fallen as illustrated in FIGS. 2A and 2B and does not activate the camera 300 (for example, when a video is being reproduced), the user makes the housing upright as illustrated in FIGS. 1A and 1B, and it is determined that the lens 301 is not covered with the user's finger or the like, the activation control unit 282 automatically activates the camera 300 (for example, after stopping the reproduction of a video when the video is being reproduced).

Fourth Embodiment

A fourth embodiment of the present invention will be described below. An electronic device 7d according to the fourth embodiment is different from the electronic device 7b according to the second embodiment, in that the user's grasping form of the housing is recognized based on the detected values output from a touch sensor 20 disposed on the side housing surface 17.

Figure 6:
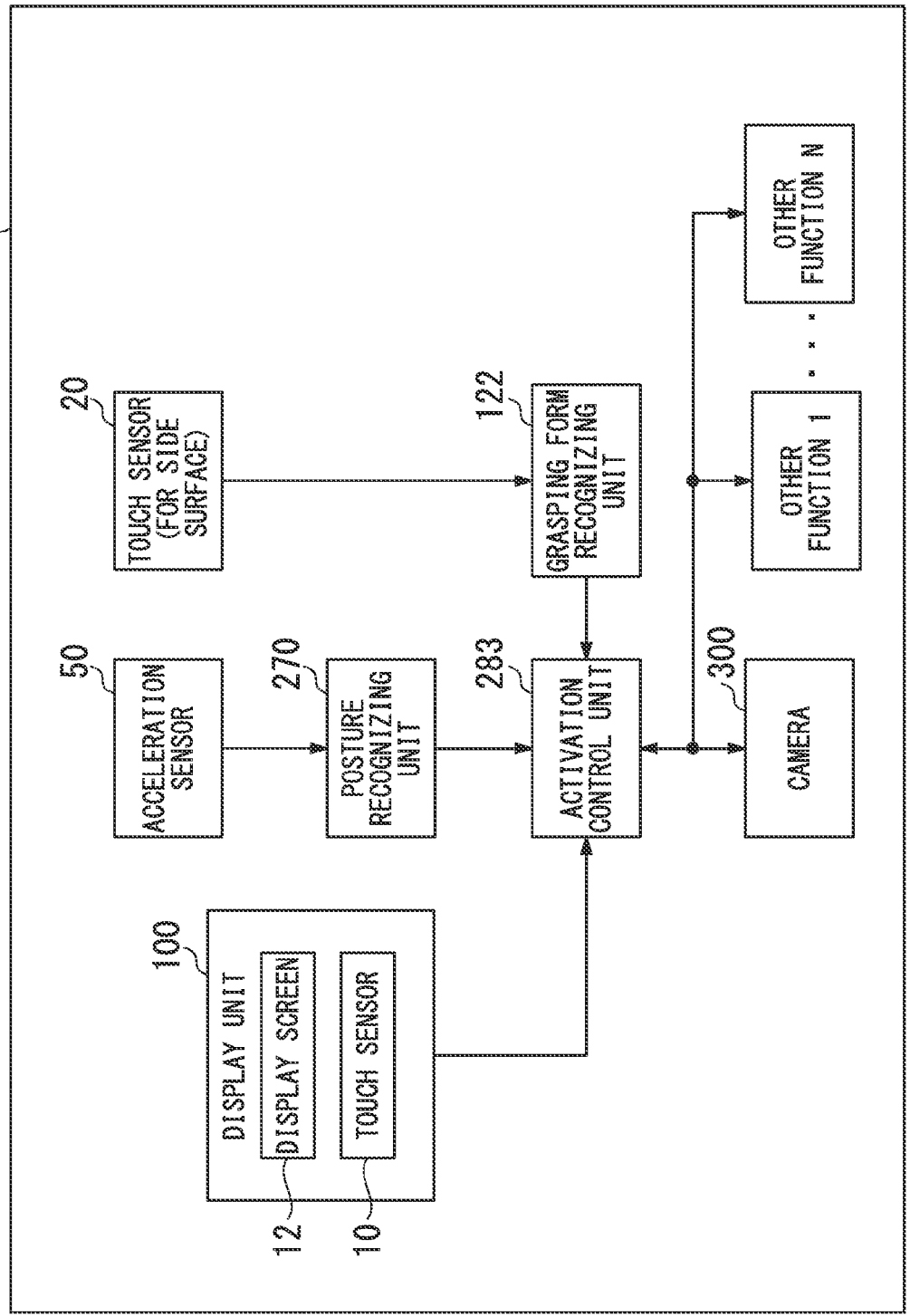
FIG. 6 is a functional block diagram illustrating an example of an electronic device according to a fourth embodiment of the present invention.

FIG. 6 is a functional block diagram illustrating an example of the electronic device 7d. The appearance of the electronic device 7d is the same as the electronic device 7a according to the first embodiment. The process flow in the electronic device 7d will be described later.

As illustrated in FIG. 6, the electronic device 7d includes a touch sensor (side surface sensor) 20, an acceleration sensor 50, a display unit 100, a grasping form recognizing unit 122, a posture recognizing unit 270, an activation control unit 283, a camera 300, and other functions 1 to N. In FIG. 6, the same reference numerals as in FIGS. 3 to 5 represent the same functions and thus a description of a part or all thereof will not be repeated here.

The touch sensor 20 is disposed on the side housing surfaces 17-1, 17-2, 17-3, and 17-4 and detects a touch of the side housing surfaces 17-1, 17-2, 17-3, and 17-4.

The grasping form recognizing unit 122 recognizes a user's grasping form of the housing. Specifically, the grasping form recognizing unit 122 recognizes (determines) whether the user's grasping form of the housing is a grasping form of covering the lens 301 of the camera 300. More specifically, the grasping form recognizing unit 122 recognizes whether the user's grasping form of the housing is a grasping form of covering the lens 301 of the camera 300 based on the detected value (touched position) output from the touch sensor 20.

In general, a position at or an amount by which the side housing surface 17 is touched with a finger or the like is different between a grasping form of covering the lens 301 and a grasping form of not covering the lens 301. Therefore, for example, the grasping form recognizing unit 122 recognizes whether the user's grasping form of the housing is the grasping form of covering the lens 301 as follows.

Similarly to the electronic device 7c, a pattern of the detected values of the touch sensor 20 in a representative grasping form of covering the lens 301 and a pattern of the detected value of the touch sensor 20 in a representative grasping form of not covering the lens 301 are acquired and stored in advance. When determining the grasping form (for example, when the posture determining unit 270 determines that the posture of the housing becomes the upright posture), the grasping form recognizing unit 122 compares the detected value currently output from the touch sensor 20 with the patterns stored in advance and recognizes whether the user's grasping form of the housing is the grasping form of covering the lens 301.

The activation control unit 283 controls activation of the camera 300 and the other functions. For example, the activation control unit 283 controls activation of the camera 300 and the other functions based on an explicit instruction input via the touch sensor 10 by a user.

When the posture determining unit 270 determines that the posture of the housing becomes the upright posture and the grasping form recognizing unit 122 recognizes that the user's grasping form of the housing is not the grasping form of covering the lens 301 of the camera, the activation control unit 283 automatically activates the camera 300. For example, when a user uses the electronic device with the housing fallen as illustrated in FIGS. 2A and 2B and does not activate the camera 300 (for example, when a video is being reproduced), the user makes the housing upright as illustrated in FIGS. 1A and 1B, and it is determined that the lens 301 is not covered with the user's finger or the like, the activation control unit 283 automatically activates the camera 300 (for example, after stopping the reproduction of a video when the video is being reproduced).

Fifth Embodiment

A fifth embodiment of the present invention will be described below. An electronic device 7e according to the fifth embodiment is different from the electronic device 7b according to the second embodiment, in that the user's grasping form of the housing is recognized based on an image (through-the-lens image) captured by the camera 300 which is temporarily activated.

Figure 7:
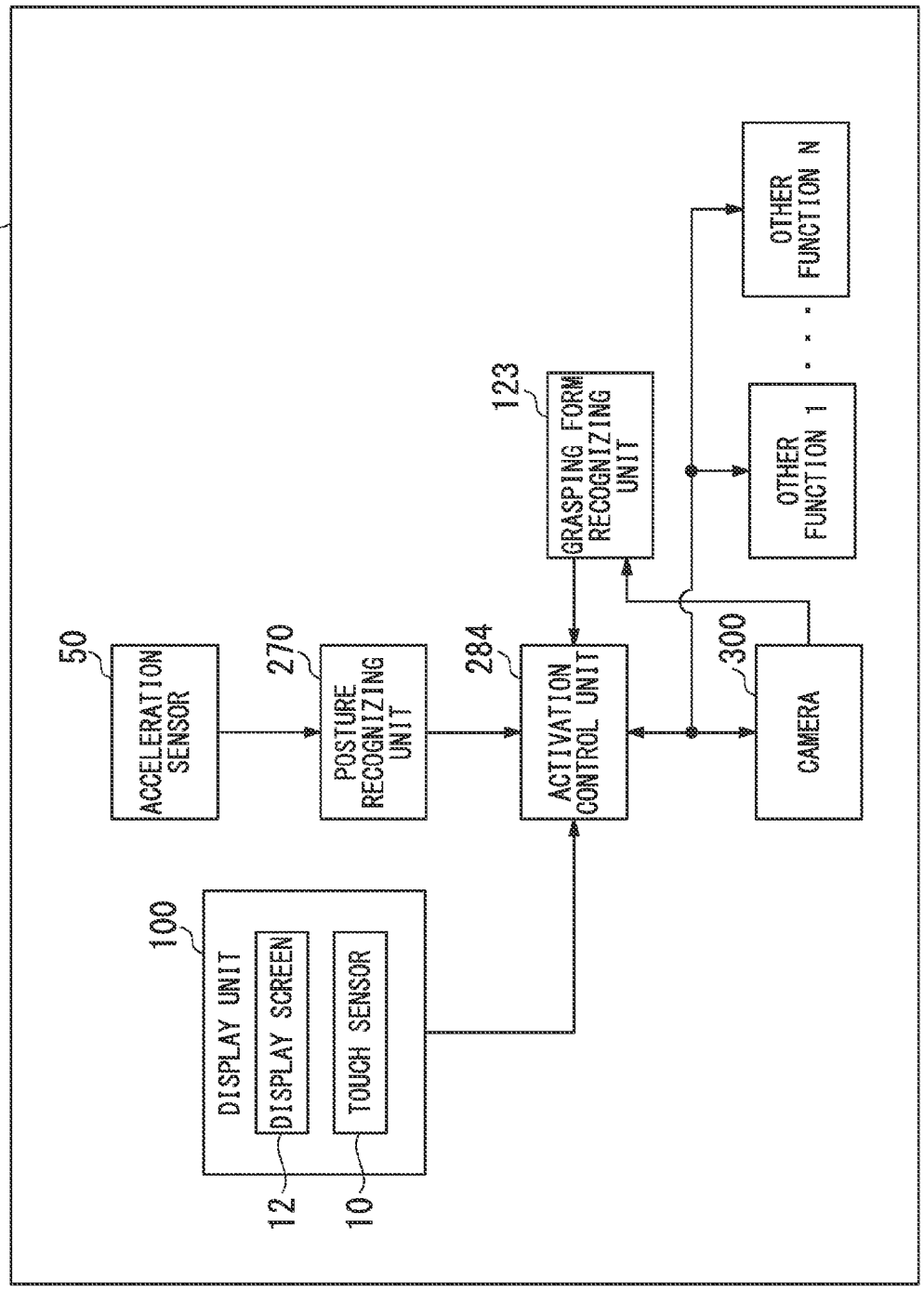
FIG. 7 is a functional block diagram illustrating an example of an electronic device according to a fifth embodiment of the present invention.

FIG. 7 is a functional block diagram illustrating an example of the electronic device 7e. The appearance of the electronic device 7e is the same as the electronic device 7a according to the first embodiment. The process flow in the electronic device 7e will be described later.

As illustrated in FIG. 7, the electronic device 7e includes an acceleration sensor 50, a display unit 100, a grasping form recognizing unit 123, a posture recognizing unit 270, an activation control unit 284, a camera 300, and other functions 1 to N. In FIG. 7, the same reference numerals as in FIGS. 3 to 6 represent the same functions and thus a description of a part or all thereof will not be repeated here.

The activation control unit 284 controls activation of the camera 300 and the other functions. For example, the activation control unit 284 controls activation of the camera 300 and the other functions based on an explicit instruction input via the touch sensor 10 by a user.

When the posture determining unit 270 determines that the posture of the housing becomes the upright posture and the grasping form recognizing unit 123 recognizes that the user's grasping form of the housing is not the grasping form of covering the lens 301, the activation control unit 284 automatically activates the camera 300.

Specifically, the activation control unit 284 temporarily activates the camera 300 at the time point at which the posture determining unit 270 determines that the posture of the housing becomes the upright posture. That is, the activation control unit 284 temporarily activates the camera 300 so as to cause the grasping form recognizing unit 123 to recognize the grasping form when the posture determining unit 270 determines that the posture of the housing becomes the upright posture.

Subsequently, the activation control unit 284 maintains (keeps) activation (execution) of the camera 300 which is temporarily activated, when the grasping form recognizing unit 123 recognizes that the user's grasping form of the housing is not the grasping form of covering the lens 301. That is, the camera 300 is kept activated until an explicit instruction to end the activation or the like is issued.

On the other hand, the activation control unit 284 ends the activation of the camera 300 which is temporarily activated when the grasping form recognizing unit 123 recognizes that the user's grasping form of the housing is the grasping form of covering the lens 301. The activation control unit 284 may activate the function activated before temporarily activating the camera 300 (may return to the function which is temporarily activated before activating the camera).

The grasping form recognizing unit 123 recognizes a user's grasping form of the housing. Specifically, the grasping form recognizing unit 123 recognizes (determines) whether the user's grasping form of the housing is a grasping form of covering the lens 301 of the camera 300. More specifically, the grasping form recognizing unit 123 recognizes whether the user's grasping form of the housing is a grasping form of covering the lens 301 of the camera 300 based on the image (through-the-lens image) captured by the camera 300 which is temporarily activated.

For example, the grasping form recognizing unit 123 recognizes that the user's grasping form of the housing is the grasping form of covering the lens 301 when the brightness value (pixel value) of the captured image is less than a predetermined threshold value, and recognizes that the user's grasping form of the housing is not the grasping form of covering the lens 301 when the brightness value of the captured image is equal to or more than the predetermined value.

For example, the grasping form recognizing unit 123 recognizes that the user's grasping form of the housing is the grasping form of covering the lens 301 when a user's palm, a user's finger, or the like actually appear in the captured image (or are estimated to appear in the captured image), and recognizes that the user's grasping form of the housing is not the grasping form of covering the lens 301 when a user's palm, a user's finger, or the like do not appear in the captured image (or are estimated not to appear in the captured image).

Sixth Embodiment

A sixth embodiment of the present invention will be described below. An electronic device 7f according to the sixth embodiment is an electronic device in which the camera 300 is automatically activated based on a condition of whether the housing is shaken in addition to the condition which is a variation in posture of the housing.

Figure 8:
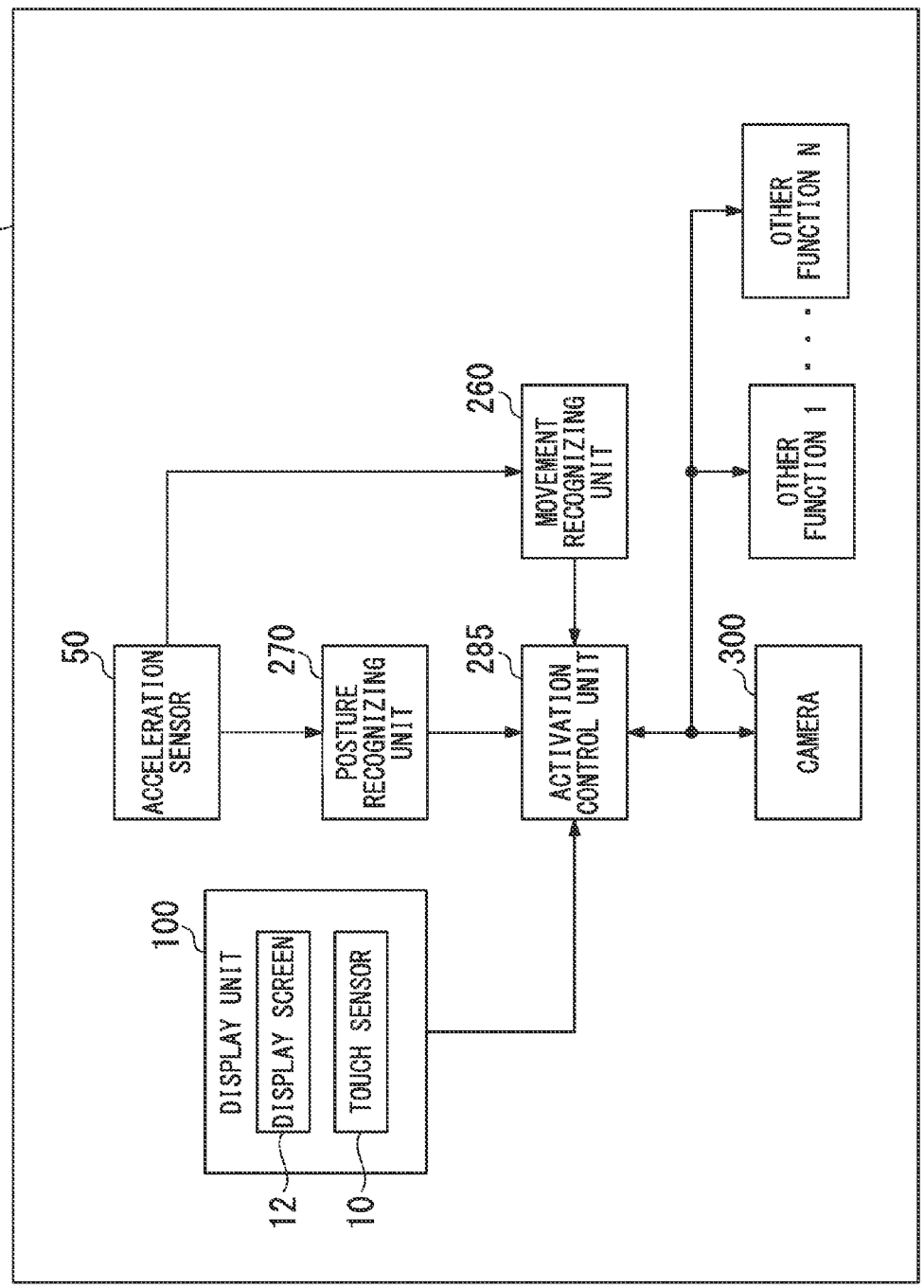
FIG. 8 is a functional block diagram illustrating an example of an electronic device according to a sixth embodiment of the present invention.

FIG. 8 is a functional block diagram illustrating an example of the electronic device 7f. The appearance of the electronic device 7f is the same as the electronic device 7a according to the first embodiment. The process flow in the electronic device 7f will be described later.

As illustrated in FIG. 8, the electronic device 7f includes an acceleration sensor 50, a display unit 100, a movement recognizing unit 260, a posture recognizing unit 270, an activation control unit 285, a camera 300, and other functions 1 to N. In FIG. 8, the same reference numerals as in FIGS. 3 to 7 represent the same functions and thus a description of a part or all thereof will not be repeated here.

The movement recognizing unit 260 recognizes movement of the housing based on the detected value of the acceleration sensor 50. For example, when a user shakes the housing, the movement recognizing unit 260 detects the acceleration in the shaking direction.

The activation control unit 285 controls activation of the camera 300 and the other functions. For example, the activation control unit 285 controls activation of the camera 300 and the other functions based on an explicit instruction input via the touch sensor 10 by a user.

When the posture determining unit 270 determines that the posture of the housing becomes the upright posture and the movement recognizing unit 260 recognizes that the housing is shaken, the activation control unit 285 automatically activates the camera 300. For example, when a user uses the electronic device with the housing fallen as illustrated in FIGS. 2A and 2B and does not activate the camera 300 (for example, when a video is being reproduced) and the user makes the housing upright as illustrated in FIGS. 1A and 1B and then shakes the housing (or when the user shakes the housing and then makes the housing upright as illustrated in FIGS. 1A and 1B), the activation control unit 285 automatically activates the camera 300 (for example, after stopping the reproduction of a video when the video is being reproduced).

Seventh Embodiment

A seventh embodiment of the present invention will be described below. An electronic device 7g according to the seventh embodiment is an electronic device in which the camera 300 is automatically activated based on a condition of whether the housing is pressed in addition to the condition which is a variation in posture of the housing.

Figure 9:
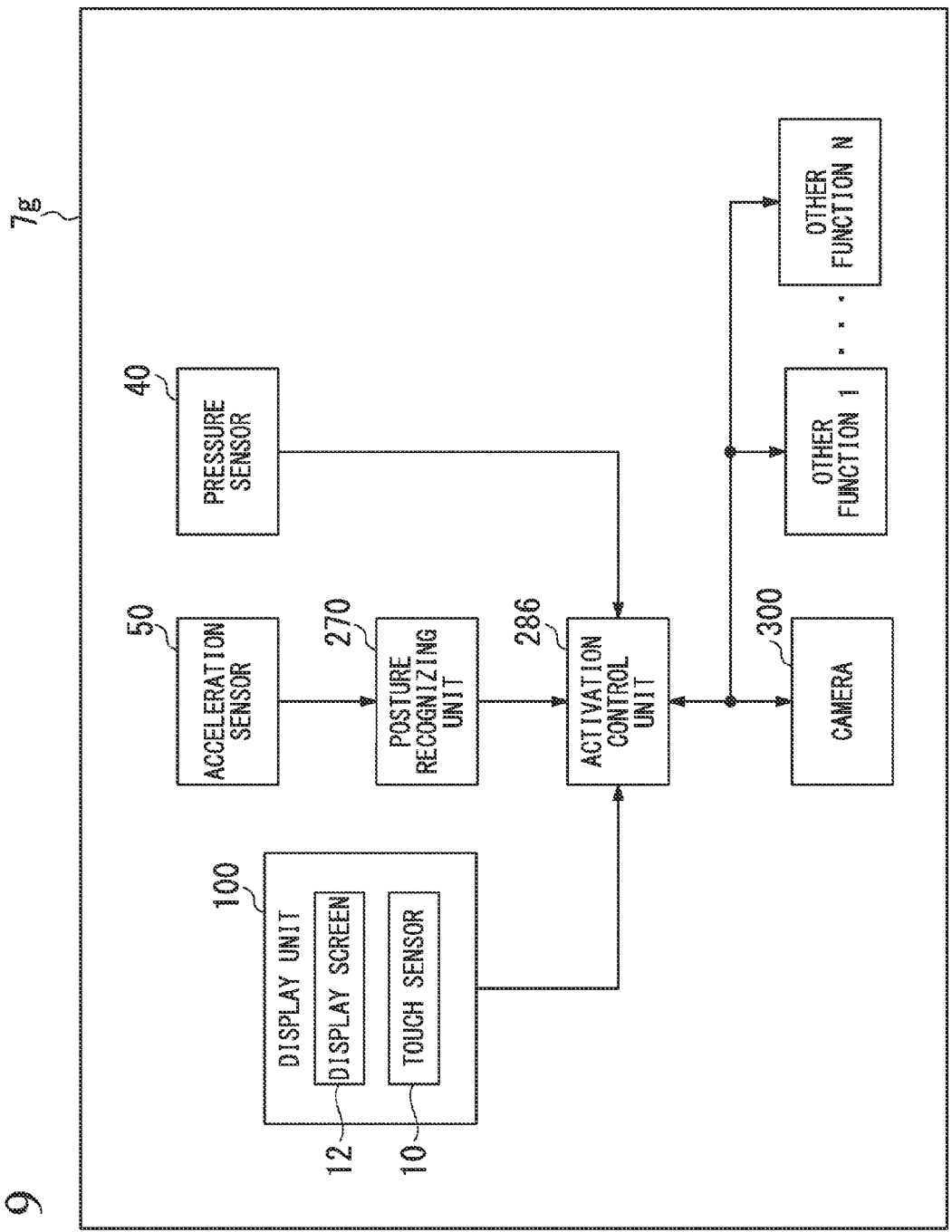
FIG. 9 is a functional block diagram illustrating an example of an electronic device according to a seventh embodiment of the present invention.

FIG. 9 is a functional block diagram illustrating an example of the electronic device 7g. The appearance of the electronic device 7g is the same as the electronic device 7a according to the first embodiment. The process flow in the electronic device 7g will be described later.

As illustrated in FIG. 9, the electronic device 7g includes a pressure sensor 40, an acceleration sensor 50, a display unit 100, a posture recognizing unit 270, an activation control unit 286, a camera 300, and other functions 1 to N. In FIG. 9, the same reference numerals as in FIGS. 3 to 8 represent the same functions and thus a description of a part or all thereof will not be repeated here.

The pressure sensor 40 detects a pressure applied to a predetermined position of the housing. For example, the pressure sensor 40 is disposed on the front peripheral area (the front sides 14 and the front corners 16) and detects a pressure applied to the front peripheral area.

The activation control unit 286 controls activation of the camera 300 and the other functions. For example, the activation control unit 286 controls activation of the camera 300 and the other functions based on an explicit instruction input via the touch sensor 10 by a user.

When the posture determining unit 270 determines that the posture of the housing becomes the upright posture and the pressure sensor 40 detects a pressure applied to a predetermined position (for example, one or more of the front sides 14-1, 14-2, 14-3, and 14-4) of the housing, the activation control unit 286 automatically activates the camera 300. For example, when a user uses the electronic device with the housing fallen as illustrated in FIGS. 2A and 2B and does not activate the camera 300 (for example, when a video is being reproduced) and the user makes the housing upright as illustrated in FIGS. 1A and 1B and then presses one front side 14 (or when the user presses one front side and then makes the housing upright as illustrated in FIGS. 1A and 1B), the activation control unit 286 automatically activates the camera 300 (for example, after stopping the reproduction of a video when the video is being reproduced).

Eighth Embodiment

An eighth embodiment of the present invention will be described below. An electronic device 7h according to the eighth embodiment is an electronic device in which the camera 300 is automatically activated based on a condition of whether a predetermined function is activated in addition to the condition which is a variation in posture of the housing.

Figure 10:
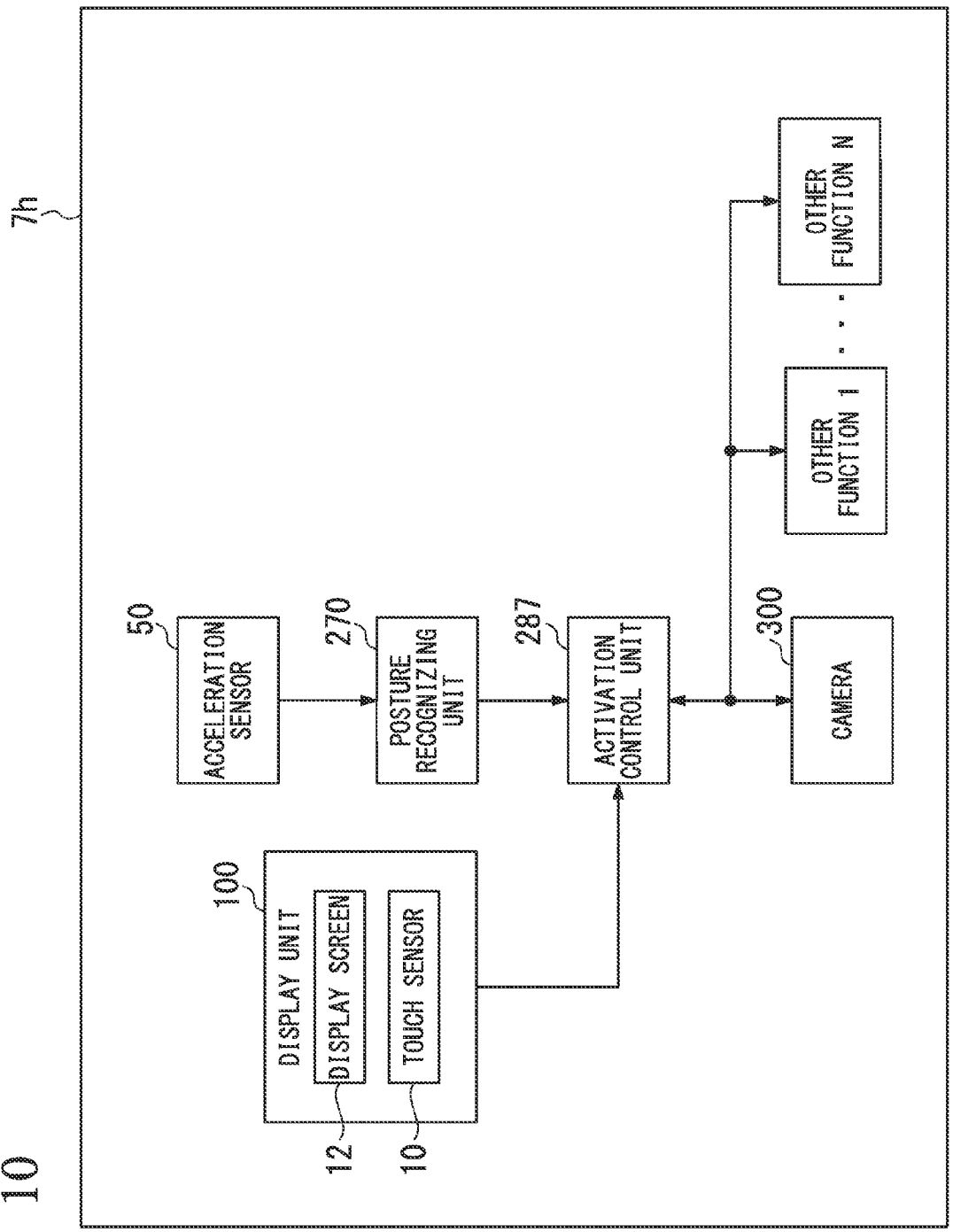
FIG. 10 is a functional block diagram illustrating an example of an electronic device according to an eighth embodiment of the present invention.

FIG. 10 is a functional block diagram illustrating an example of the electronic device 7*h*. The appearance of the electronic device 7*h* is the same as the electronic device 7*a* according to the first embodiment. The process flow in the electronic device 7*h* will be described later.

As illustrated in FIG. 10, the electronic device 7*h* includes an acceleration sensor 50, a display unit 100, a posture recognizing unit 270, an activation control unit 287, a camera 300, and other functions 1 to N. In FIG. 10, the same reference numerals as in FIGS. 3 to 9 represent the same functions and thus a description of a part or all thereof will not be repeated here.

The activation control unit 287 controls activation of the camera 300 and the other functions. For example, the activation control unit 287 controls activation of the camera 300 and the other functions based on an explicit instruction input via the touch sensor 10 by a user.

When the posture determining unit 270 determines that the posture of the housing becomes the upright posture and a predetermined function is activated, the activation control unit 287 automatically activates the camera 300. For example, when a user uses the electronic device with the housing fallen as illustrated in FIGS. 2A and 2B and does not activate the camera 300, the user makes the housing upright as illustrated in FIGS. 1A and 1B, and a predetermined function (for example, reproduction of a video) is activated (performed) (in other words, the user makes the housing upright while activating (performing) a predetermined function), the activation control unit stops the predetermined function and automatically activates the camera 300.

Hereinafter, process flows in the electronic devices 7*a* to 7*h* according to the first to eighth embodiments of the present invention will be described.

Figure 11A:
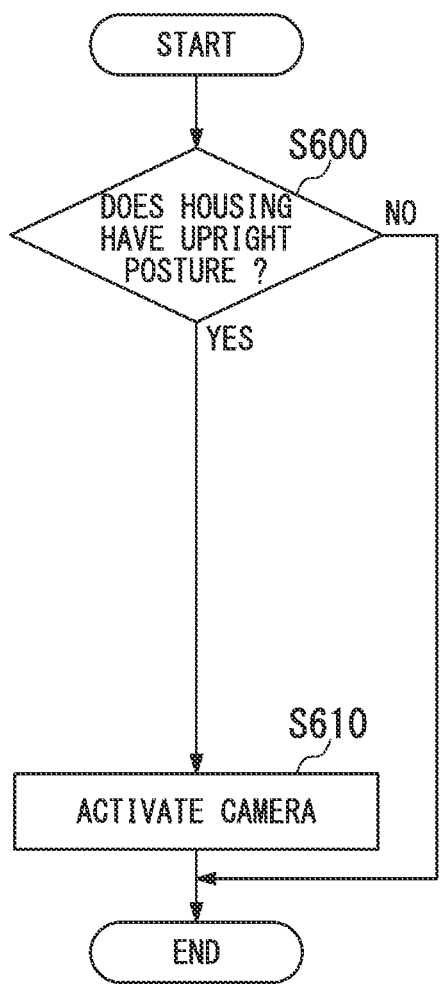
FIG. 11A is a flowchart illustrating an example of a process flow in an electronic device according to the present invention.
Figure 11B:
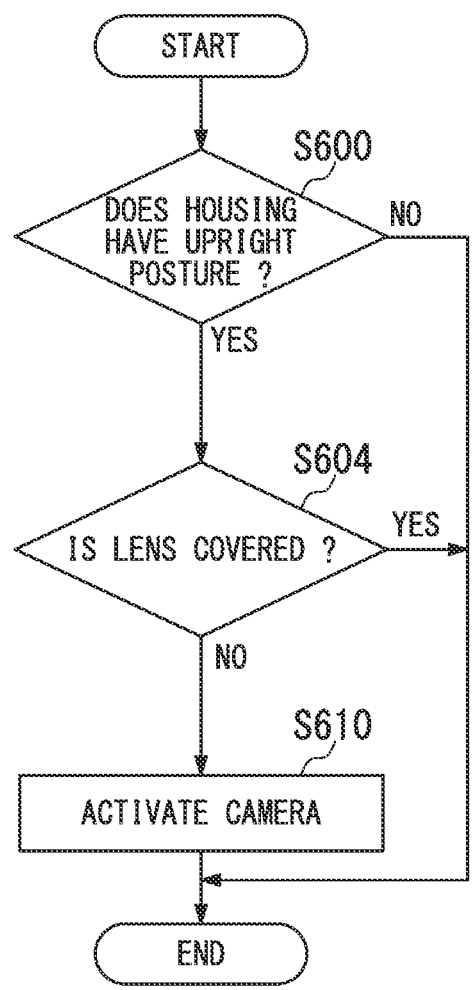
FIG. 11B is a flowchart illustrating an example of a process flow in an electronic device according to the present invention.
Figure 11C:
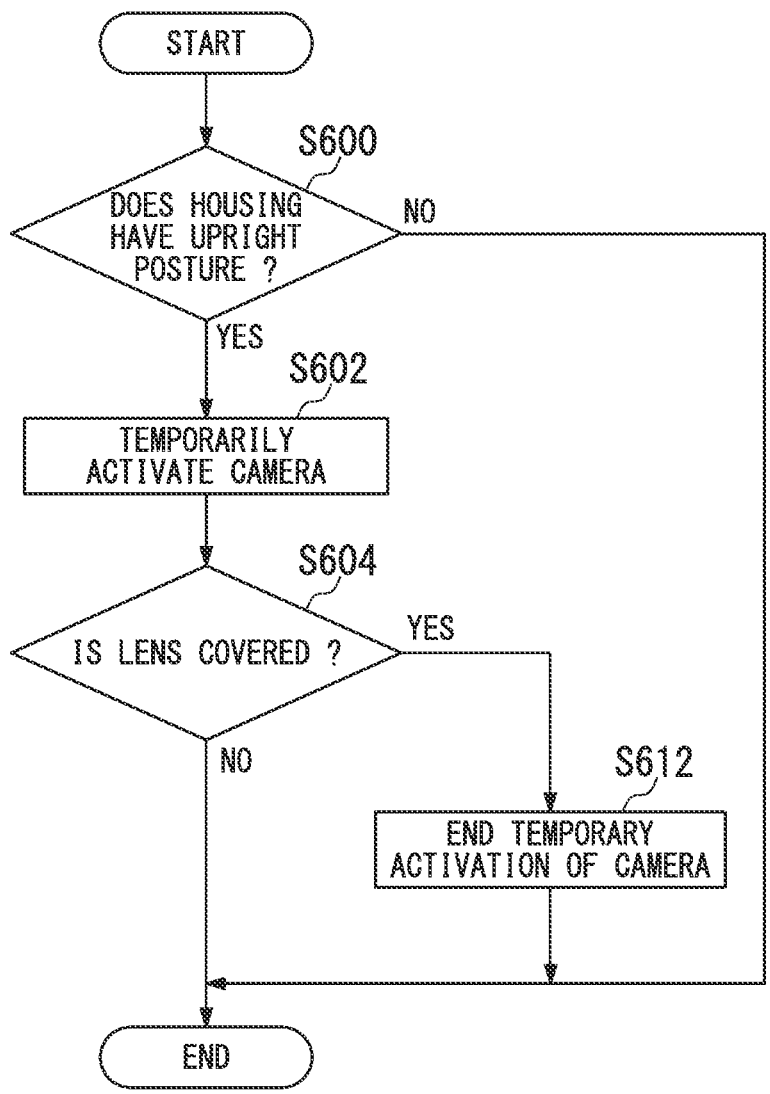
FIG. 11C is a flowchart illustrating an example of a process flow in an electronic device according to the present invention.
Figure 12A:
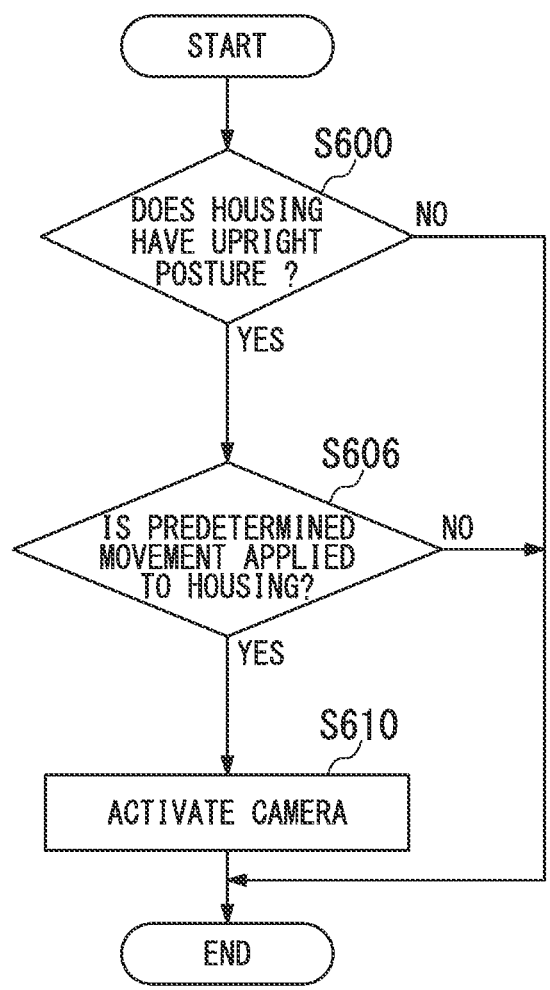
FIG. 12A is a flowchart illustrating an example of a process flow in an electronic device according to the present invention.
Figure 12B:
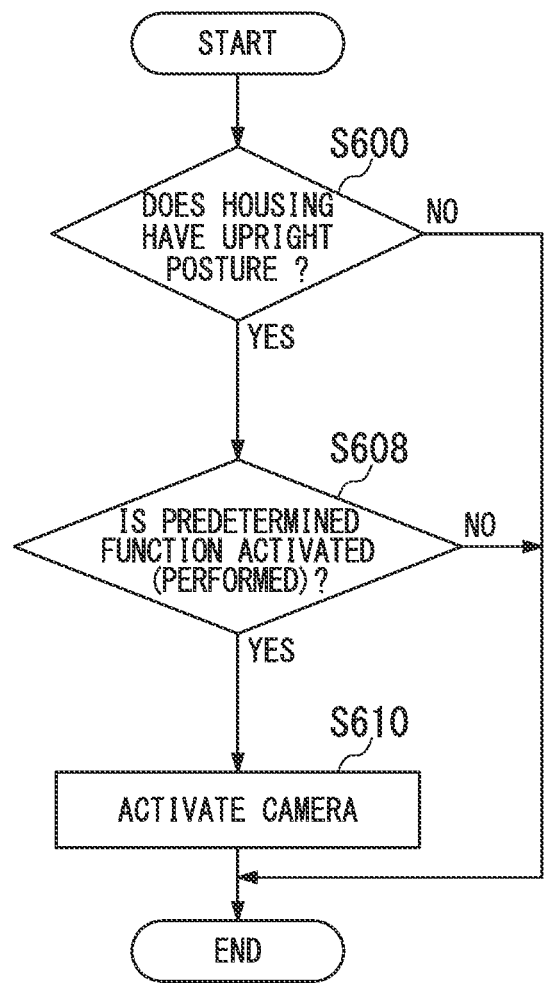
FIG. 12B is a flowchart illustrating an example of a process flow in an electronic device according to the present invention.

FIGS. 11A, 11B, and 11C are examples of a flowchart illustrating the process flow of the electronic device (7*a* and the like) according to the present invention. FIGS. 12A and 12B are examples of a flowchart illustrating the process flow of the electronic device (7*f* and the like) according to the present invention. Each flowchart starts when the acceleration sensor 50 detects an acceleration applied to the housing. At the time of starting each flowchart, it is assumed that the housing is in a fallen state and the camera 300 is not activated.

(Electronic Device 7*a*)

The process flow in the electronic device 7*a* according to the first embodiment will be described below.

In FIG. 11A, the posture determining unit 270 of the electronic device 7*a* determines whether the housing has an upright posture based on the detection result of the acceleration sensor 50 (step S600). When it is determined that the housing does not have an upright posture (NO in step S600), the flowchart illustrated in FIG. 11A ends.

On the other hand, when it is determined that the housing has an upright posture (YES in step S600), the activation control unit 280 activates the camera 300 (step S610). Then, the flowchart illustrated in FIG. 11A ends.

(Electronic Device 7*b*)

The process flow in the electronic device 7*b* according to the second embodiment will be described below. This flowchart is illustrated in FIG. 11B.

In FIG. 11B, the posture determining unit 270 of the electronic device 7*b* determines whether the housing has an upright posture based on the detection result of the acceleration sensor 50 (step S600). When it is determined in step S600 that the housing does not have an upright posture (NO in step S600), the flowchart illustrated in FIG. 11B ends.

When it is determined in step S600 that the housing has an upright posture (YES in step S600), the grasping form recognizing unit 120 determines whether a user's grasping form of the housing is a grasping form of covering the lens 301 based on the detected value output from the illuminance sensor 70 (step S604).

When it is determined in step S604 that the user's grasping form of the housing is a grasping form of covering the lens 301 (YES in step S604), the flowchart illustrated in FIG. 11B ends.

On the other hand, when it is determined in step S604 that the user's grasping form of the housing is not a grasping form of covering the lens 301 (NO in step S604), the activation control unit 281 activates the camera 300 (step S610). Then, the flowchart illustrated in FIG. 11B ends.

(Electronic Device 7*c*)

The process flow in the electronic device 7*c* according to the third embodiment will be described below. This flowchart is illustrated in FIG. 11B, which is the same as for the electronic device 7*b*.

In FIG. 11B, the posture determining unit 270 of the electronic device 7*c* determines whether the housing has an upright posture based on the detection result of the acceleration sensor 50 (step S600). When it is determined in step S600 that the housing does not have an upright posture (NO in step S600), the flowchart illustrated in FIG. 11B ends.

When it is determined in step S600 that the housing has an upright posture (YES in step S600), the grasping form recognizing unit 121 determines whether a user's grasping form of the housing is a grasping form of covering the lens 301 based on the detected values output from the touch sensor 10 (step S604).

When it is determined in step S604 that the user's grasping form of the housing is a grasping form of covering the lens 301 (YES in step S604), the flowchart illustrated in FIG. 11B ends.

On the other hand, when it is determined in step S604 that the user's grasping form of the housing is not a grasping form of covering the lens 301 (NO in step S604), the activation control unit 282 activates the camera 300 (step S610). Then, the flowchart illustrated in FIG. 11B ends.

(Electronic Device 7*d*)

The process flow in the electronic device 7*d* according to the fourth embodiment will be described below. This flowchart is illustrated in FIG. 11B, which is the same as for the electronic device 7*b*.

In FIG. 11B, the posture determining unit 270 of the electronic device 7*d* determines whether the housing has an upright posture based on the detection result of the acceleration sensor 50 (step S600). When it is determined in step S600 that the housing does not have an upright posture (NO in step S600), the flowchart illustrated in FIG. 11B ends.

When it is determined in step S600 that the housing has an upright posture (YES in step S600), the grasping form recognizing unit 122 determines whether a user's grasping form of the housing is a grasping form of covering the lens 301 based on the detected value output from the touch sensor 20 (step S604).

When it is determined in step S604 that the user's grasping form of the housing is a grasping form of covering the lens 301 (YES in step S604), the flowchart illustrated in FIG. 11B ends.

On the other hand, when it is determined in step S604 that the user's grasping form of the housing is not a grasping form of covering the lens 301 (NO in step S604), the activation control unit 283 activates the camera 300 (step S610). Then, the flowchart illustrated in FIG. 11B ends.

(Electronic Device 7e)

The process flow in the electronic device 7e according to the fifth embodiment will be described below. This flowchart is illustrated in FIG. 11C.

In FIG. 11C, the posture determining unit 270 of the electronic device 7e determines whether the housing has an upright posture based on the detection result of the acceleration sensor 50 (step S600). When it is determined in step S600 that the housing does not have an upright posture (NO in step S600), the flowchart illustrated in FIG. 11C ends.

When it is determined in step S600 that the housing has an upright posture (YES in step S600), the activation control unit 284 temporarily activates the camera 300 (step S602).

Subsequently to step S602, the grasping form recognizing unit 123 determines whether the user's grasping form of the housing is the grasping form of covering the lens 301 of the camera 300 based on an image (through-the-lens image) captured by the camera 300 which is temporarily activated in step S602 (step S604).

When it is determined in step S604 that the user's grasping form of the housing is the grasping form of covering the lens 301 (YES in step S604), the activation control unit 284 ends the activation (execution) of the camera 300 which is temporarily activated in step S602 (step S612). Then, the flowchart illustrated in FIG. 11C ends.

On the other hand, when it is determined in step S604 that the user's grasping form of the housing is not the grasping form of covering the lens 301 (NO in step S604), the flowchart illustrated in FIG. 11C ends. That is, the activation control unit 284 maintains (keeps) the activation of the camera 300 which is temporarily activated in step S602 (that is, the camera 300 is kept activated until an explicit instruction to end the activation or the like is issued), when the user's grasping form of the housing is not the grasping form of covering the lens 301.

(Electronic Device 7f)

The process flow in the electronic device 7f according to the sixth embodiment will be described below. This flowchart is illustrated in FIG. 12A.

In FIG. 12A, the posture determining unit 270 of the electronic device 7f determines whether the housing has an upright posture based on the detection result of the acceleration sensor 50 (step S600). When it is determined in step S600 that the housing does not have an upright posture (NO in step S600), the flowchart illustrated in FIG. 12A ends.

When it is determined in step S600 that the housing has the upright posture (YES in step S600), it is determined whether a predetermined movement is applied to the housing (step S606). Specifically, the movement recognizing unit 260 determines whether the housing is shaken based on the detected values output from the acceleration sensor 50 (step S606).

When it is determined in step S606 that the housing does not shake (NO in step S606), the flowchart illustrated in FIG. 12A ends.

On the other hand, when it is determined in step S606 that the housing is shaken (YES in step S606), the activation control unit 285 activates the camera 300 (step S610). The flowchart illustrated in FIG. 12A ends.

(Electronic Device 7g)

The process flow in the electronic device 7g according to the seventh embodiment will be described below. This flowchart is illustrated in FIG. 12A, which is the same as for the electronic device 7f.

In FIG. 12A, the posture determining unit 270 of the electronic device 7g determines whether the housing has an upright posture based on the detection result of the acceleration sensor 50 (step S600). When it is determined in step S600 that the housing does not have an upright posture (NO in step S600), the flowchart illustrated in FIG. 12A ends.

When it is determined in step S600 that the housing has the upright posture (YES in step S600), it is determined whether a predetermined movement is applied to the housing (step S606). Specifically, the activation control unit 286 determines whether the housing is pressed based on the detected values output from the pressure sensor 40 (step S606).

When it is determined in step S606 that the housing is not pressed (NO in step S606), the flowchart illustrated in FIG. 12A ends.

On the other hand, when it is determined in step S606 that the housing is pressed (YES in step S606), the activation control unit 286 activates the camera 300 (step S610). The flowchart illustrated in FIG. 12A ends.

(Electronic Device 7h)

The process flow in the electronic device 7h according to the eighth embodiment will be described below. This flowchart is illustrated in FIG. 12B.

In FIG. 12B, the posture determining unit 270 of the electronic device 7h determines whether the housing has an upright posture based on the detection result of the acceleration sensor 50 (step S600). When it is determined in step S600 that the housing does not have an upright posture (NO in step S600), the flowchart illustrated in FIG. 12B ends.

When it is determined in step S600 that the housing has the upright posture (YES in step S600), the activation control unit 287 determines whether a predetermined function (for example, reproduction of a video) is activated (performed) (step S608).

When it is determined in step S608 that the predetermined function is not activated (NO in step S608), the flowchart illustrated in FIG. 12B ends. That is, when a function other than the predetermined function is activated, the camera 300 is not activated in spite of a variation in posture of the housing to the upright posture.

On the other hand, when it is determined in step S608 that the predetermined function is activated (YES in step S608), the activation control unit 287 activates the camera 300 (step S610).

Then, the flowchart illustrated in FIG. 12B ends.

According to the above-mentioned electronic device 7a, it is possible to further improve the operability. That is, it is possible to activate the camera 300 with a simple operation of making the housing upright. According to the electronic devices 7b to 7h, it is possible to appropriately activate the camera 300 depending on a predetermined condition when the camera 300 is made to be upright.

Regarding recognition of a grasping form, the method (the electronic device 7b according to the second embodiment) of recognizing the grasping form based on the brightness around the lens 301, the method (the electronic device 7c according to the third embodiment) of recognizing the grasping form based on the touched position of the display screen 12, the method (the electronic device 7d according to the fourth embodiment) of recognizing the grasping form based on the touched position of the side housing surface 17, the method (the electronic device 7e according to the fifth embodiment) of recognizing the grasping form based on the captured image are exemplified above, but the method of recognizing the grasping form is not limited to these methods. For example, the grasping form may be recognized based on the detected values of the pressure sensor 40. For example, similarly to the electronic devices 7c and 7d, by storing the patterns of the detected values of the pressure sensor 40 in advance, the grasping form recognizing unit may recognize whether the user's grasping form of the housing is the grasping form of covering the lens 301.

The operation (the electronic device 7f according to the sixth embodiment) of shaking the housing and the operation (the electronic device 7g according to the seventh embodiment) of pressing the housing in the embodiments in which the camera 300 is automatically activated using the condition of a predetermined movement applied to the housing in addition to the condition of a variation in posture of the housing are described above, but the predetermined movement is not limited to these operations. For example, the predetermined movement may be an operation of touching an arbitrary position (not a predetermined icon) of the display screen 12.

The above-mentioned various processes in the electronic devices 7a to 7h according to the embodiments of the present invention may be performed by recording a program for performing the processes of the electronic devices 7a to 7h according to the embodiments of the present invention on a computer-readable recording medium and reading and executing the program recorded on the recording medium in a computer system. The "computer system" mentioned herein may include an OS or hardware such as peripherals.

The "computer system" may include homepage providing environments (or homepage display environments) as long as it uses a WWW system. Examples of the "computer-readable recording medium" include a floppy (registered trademark) disk, a magneto-optical disk, an SD card, a writable nonvolatile memory such as a flash memory, a portable medium such as a CD-ROM, and a storage device such as a hard disk built into a computer system.

The "computer-readable recording medium" may include a medium holding a program for a predetermined time such as a nonvolatile memory (for example, a DRAM (Dynamic Random Access Memory)) in a computer system serving as a server or a client in a case where the program is transmitted via a network such as the Internet or a communication line such as a telephone line. The program may be transmitted from a computer system in which the program is stored in a storage device or the like thereof to another computer system via a transmission medium or by transmission waves in the transmission medium. Here, the "transmission medium" through which a program is transmitted means a medium having a function of transmitting information such as a network (communication network) such as the Internet or a communication circuit (communication line) such as a telephone line. The program may be designed to realize a part of the above-mentioned functions. The program may be a program that can implement the above-mentioned functions by combination with a program recorded in advance in the computer system, for example, a differential file (differential program).

While the embodiments of the present invention are described above in detail with reference to the accompanying drawings, the specific configuration of the present invention is not limited to the embodiments and includes modifications in design without departing from the gist of the present invention.

An electronic device according to an embodiment of the present invention includes: a camera; an acceleration sensor that detects an acceleration applied to a housing; a posture determining unit that determines a posture of the housing based on a value detected by the acceleration sensor; an activation control unit that activates the camera when the posture determining unit determines that the posture of the housing becomes an upright posture; and a grasping form recognizing unit that recognizes a user's grasping form of the housing, wherein the activation control unit activates the camera when the posture determining unit determines that the posture of the housing becomes the upright posture and the grasping form recognizing unit recognizes that the user's grasping form of the housing is not a grasping form of covering a lens of the camera.

In the embodiment, the electronic device may further include an illuminance sensor, and the grasping form recognizing unit may be configured to recognize whether the user's grasping form of the housing is a grasping form of covering the lens of the camera based on the detected value output from the illuminance sensor.

In the embodiment, the electronic device may further include a touch panel that detects a user's touch, and the grasping form recognizing unit may be configured to recognize whether the user's grasping form of the housing is a grasping form of covering the lens of the camera based on a position of the touch.

In the embodiment, the electronic device may further include a touch sensor that recognizes a touch of a side surface of the housing, and the grasping form recognizing unit may be configured to recognize whether the user's grasping form of the housing is a grasping form of covering the lens of the camera based on a position of the touch of the side surface.

In the embodiment, the activation control unit may temporarily activate the camera when the posture determining unit determines that the posture of the housing becomes the upright posture, and the grasping form recognizing unit may recognize whether the user's grasping form of the housing is a grasping form of covering the lens of the camera based on an image captured by the camera which is temporarily activated.

What is claimed is:

1. An electronic device comprising:
    a housing;
    a camera;
    an acceleration sensor that detects an acceleration applied to the housing;
    a posture determining unit that determines a posture of the housing based on a value detected by the acceleration sensor;
    an activation control unit that activates the camera when the posture determining unit determines that the posture of the housing becomes an upright posture; and
    a grasping form recognizing unit that recognizes a user's grasping form of the housing,
    wherein the activation control unit activates the camera when the posture determining unit determines that the posture of the housing becomes the upright posture and the grasping form recognizing unit recognizes that the user's grasping form of the housing is not a grasping form of covering a lens of the camera.

2. The electronic device according to claim 1, further comprising an illuminance sensor,
    wherein the grasping form recognizing unit recognizes whether the user's grasping form of the housing is a grasping form of covering the lens of the camera based on the detected value output from the illuminance sensor.

3. The electronic device according to claim 1, further comprising a touch panel that detects a user's touch,
   wherein the grasping form recognizing unit recognizes whether the user's grasping form of the housing is a grasping form of covering the lens of the camera based on a position of the touch.

4. The electronic device according to claim 1, further comprising a touch sensor that recognizes a touch of a side surface of the housing,
   wherein the grasping form recognizing unit recognizes whether the user's grasping form of the housing is a grasping form of covering the lens of the camera based on a position of the touch of the side surface.

5. The electronic device according to claim 1, wherein the activation control unit temporarily activates the camera when the posture determining unit determines that the posture of the housing becomes the upright posture, and
   wherein the grasping form recognizing unit recognizes whether the user's grasping form of the housing is a grasping form of covering the lens of the camera based on an image captured by the camera which is temporarily activated.

* * * * *